United States Patent
Logsdon et al.

(10) Patent No.: US 8,417,367 B1
(45) Date of Patent: Apr. 9, 2013

(54) MANUFACTURING EXCEPTION HANDLING SYSTEM

(75) Inventors: George Logsdon, Arlington, TX (US); Ramesh Rao, Arlington, TX (US); Teresa Colpaert, Grand Prairie, TX (US); Michael A. Hart, Arlington, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 2155 days.

(21) Appl. No.: 10/920,834

(22) Filed: Aug. 18, 2004

(51) Int. Cl.
*G06F 19/00* (2006.01)

(52) U.S. Cl.
USPC .............................. 700/100; 700/96

(58) Field of Classification Search ............ 700/100
See application file for complete search history.

(56) References Cited

U.S. PATENT DOCUMENTS

| | | | |
|---|---|---|---|
| 6,470,231 B1* | 10/2002 | Yang et al. | 700/121 |
| 7,043,321 B2* | 5/2006 | Ruml et al. | 700/100 |
| 2002/0183880 A1* | 12/2002 | Arima et al. | 700/110 |

\* cited by examiner

*Primary Examiner* — Mohammad Ali
*Assistant Examiner* — Sheela S Rao
(74) *Attorney, Agent, or Firm* — Andrew S. Viger; Wade J. Brady, III; Frederick J. Telecky, Jr.

(57) ABSTRACT

A manufacturing exception handling system is described for use with a manufacturing execution system that controls a semiconductor manufacturing process. The present invention provides real time information to the user that identifies restrictions that have been placed on the use of entities and inventories in the semiconductor manufacturing process. The present invention also provides real time information to the user that identifies the persons who are authorized to remove the restrictions. The present invention saves the time and effort that would otherwise be required to find out why a restriction existed and who could remove the restriction during the semiconductor manufacturing process.

40 Claims, 5 Drawing Sheets

| Lot_Number | Contact | Restricted_Entity | Restriction_Cause |
|---|---|---|---|
| E005046CA | Lead Associate | ALL | Lot Based FCMM: E005046CA |
| E005046CA | Lead Associate/ Sustaining Engineer | ALL | The lot (E005046CA) is on hold with category = PG. |
| E005046CA | Sustaining Engineer | ASM5000 05 | The next scripted event (CLUSTER STEP) for the lot (E005046CA) is not allowed for entity (ASM5000 05). |

MANUFACTURING EXCEPTION HANDLING SYSTEM

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD OF THE INVENTION

The present invention is generally directed to semiconductor manufacturing technology and, in particular, to a system and method for identifying restrictions that have been placed on entities and inventories during a semiconductor manufacturing process.

BACKGROUND OF THE INVENTION

A semiconductor manufacturing process may comprise a number of separate subtasks. A subtask may comprise a set of operational steps that are all performed on a single entity. An entity is a physical object (e.g., a tool) that is used in the manufacture of the semiconductor wafers. For example, an entity may be a diffusion wetdeck, an implanter unit, a semiconductor oven, or any other similar type of manufacturing equipment. A semiconductor manufacturing process may utilize the entities to manufacture particular types of semiconductor wafers. The particular types of semiconductor wafers are referred to as inventory.

Prior art manufacturing execution systems exist that are capable of controlling a semiconductor manufacturing process. A manufacturing execution system comprises computer hardware and computer software that is capable of controlling the entities and the inventories that are used in the manufacture of semiconductor wafers. A manufacturing execution system receives information concerning the status of the different entities and concerning the status of the different inventories during the manufacture of semiconductor wafers.

The various processes of the semiconductor manufacturing process must be performed on the correct inventory using the correct entities in the correct order. If the manufacturing execution system determines that a particular inventory is not being used on a correct entity, then the manufacturing execution system will not allow the entity to operate. Similarly, if the manufacturing execution system determines that a particular inventory is not being processed on an entity in a correct order, the manufacturing execution system will not allow the entity to operate until the inventory is processed in the correct order.

There may be various restrictions that are put in place to regulate whether a particular entity (i.e., a particular tool) may be used to perform work on a particular type of inventory (i.e., a particular type of wafer lot). The manufacturing execution system keeps track of all of the restrictions imposed on the various entities and inventories of which the manufacturing execution system is aware. There may also exist various restrictions that are not known to the manufacturing execution system.

The restriction information in prior art manufacturing execution systems is not easily accessible to a user. Often a user is completely unaware of the existence of any restriction until the manufacturing execution system will not perform a requested procedure. In many instances the first time that the user knows that a particular entity will not accept a particular inventory is when the user tries to perform work on the inventory using the entity.

When the user finds out that a restriction exists, the user has to stop the semiconductor manufacturing process, search for the reason that the restriction exists, and then try to find a person who is authorized to remove the restriction. This procedure wastes valuable semiconductor processing time because the semiconductor manufacturing process is halted until the restriction information is located and the restriction is removed.

Therefore, there is a need in the art for a system and method that is capable of quickly and effectively identifying restrictions that have been placed on entities and inventories during a semiconductor manufacturing process.

SUMMARY OF THE INVENTION

To address the above-discussed deficiencies of the prior art, it is a primary object of the present invention to provide a system and method for quickly and effectively identifying restrictions that have been placed on entities and inventories during a semiconductor manufacturing process.

In one advantageous embodiment the present invention comprises a manufacturing exception handling system for use with a manufacturing execution system that controls a semiconductor manufacturing process. The manufacturing exception handling system of the present invention provides real time information to the user that identifies restrictions that have been placed on the use of entities and inventories in the semiconductor manufacturing process. The manufacturing exception handling system of present invention also provides real time information to the user that identifies the persons who are authorized to remove the restrictions. The manufacturing exception handling system of present invention saves the time and effort that would otherwise be required to find out why a restriction existed and who could remove the restriction during the semiconductor manufacturing process.

In one advantageous embodiment of the present invention the manufacturing exception handling system receives input from the user that requests restriction information on a specific entity and a specific inventory. The manufacturing exception handling system searches a database in the manufacturing execution system to find the requested restriction information. Alternatively, the manufacturing exception handling system receives the requested restriction information from a source that is external to the manufacturing execution system. The manufacturing exception handling system prepares a report with the requested restriction information and displays the requested restriction information on a manufacturing exception handling system user interface. The user can then take action to remove the restriction on the entity and/or on the inventory.

It is an object of the present invention to provide a system and method for quickly and effectively identifying restrictions that have been placed on entities and inventories during a semiconductor manufacturing process.

It is also an object of the present invention to provide a system and method for quickly and effectively searching for restriction information in a manufacturing execution system.

It is yet another object of the present invention to provide a system and method quickly and effectively presenting restriction information to a user during a semiconductor manufacturing process.

It is still another object of the present invention to provide a system and method for saving valuable semiconductor processing time that would otherwise be lost while a user determines why a restriction was placed on an entity or on an inventory in a semiconductor manufacturing process.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged manufacturing process for semiconductor wafers.

Figure 1:
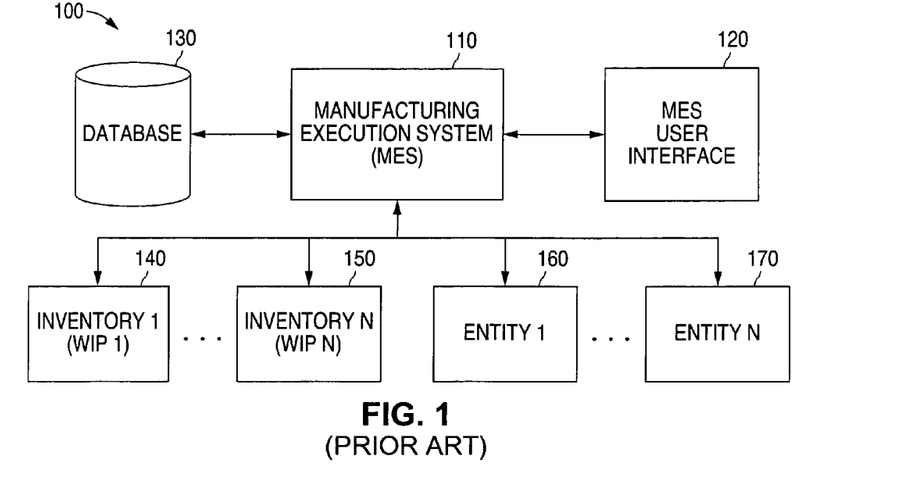
FIG. 1 illustrates a schematic representation of a prior art manufacturing execution system (MES) for use in manufacturing semiconductor wafers.

FIG. 1 illustrates a schematic representation of a portion of an exemplary prior art semiconductor manufacturing system 100. System 100 comprises a manufacturing execution system (MES) 110. The manufacturing execution system (MES) 110 comprises computer hardware and computer software that is capable of controlling elements that are used in the manufacture of semiconductor wafers. The manufacturing execution system (MES) 110 is coupled to an MES user interface 120. MES user interface 120 may comprise any conventional computerized display device including, without limitation, a web-linked interface. The user of the manufacturing execution system (MES) 110 may enter commands and provide information to the manufacturing execution system (MES) 110 through the MES user interface 120. The user of the manufacturing execution system (MES) 110 may also receive information from the manufacturing execution system (MES) 110 through the MES user interface 120.

The manufacturing execution system (MES) 110 is also coupled to a database 130. Database 130 receives and stores information from the manufacturing execution system (MES) 110 for later retrieval by the manufacturing execution system (MES).

The manufacturing execution system (MES) 110 receives information concerning the status of a plurality of different groups of inventory during the manufacture of semiconductor wafers. The plurality of groups of inventory are represented symbolically in FIG. 1. Inventory 1 (also referred to as "work in progress 1" or "WIP 1") is designated with reference numeral 140. There may be N different groups of inventory where N is an integer. Inventory N (also referred to as "work in progress N" or "WIP N") is designated with reference numeral 150.

The inventory groups, 140 through 150, represent individual semiconductor wafer lots. A preselected list of operations is performed on each type of semiconductor wafer lot (i.e., on each type of inventory group). The preselected list of operations for each type of semiconductor wafer lot is usually referred to as a "route." A route may typically comprise three hundred (300) individual operations that are to be performed on a semiconductor wafer lot. In some cases a route may comprise thousands of individual operations.

For example, an operational route for a photolithography process may comprise: (1) a coating step, (2) an exposure step, (3) a development step, and (4) an inspection step. If the inspection step finds that the semiconductor wafers have failed to meet the manufacturing specifications, the semiconductor wafers may be reworked and cleaned and resubmitted in an attempt to successfully perform the desired photolithography process.

An overall operational route for a semiconductor wafer may be made up of a number of subtasks. A subtask may comprise a set of operational steps that are all performed on a single entity. An entity is a physical object (e.g., a tool) that is used in the manufacture of the semiconductor wafers. For example, an entity may be a diffusion wetdeck, an implanter unit, a semiconductor oven, or any other similar type of manufacturing equipment.

The manufacturing execution system (MES) 110 receives information concerning the status of the different entities during the manufacture of semiconductor wafers. The different entities are represented symbolically in FIG. 1. Entity 1 is designated with reference numeral 160. There may be N different entities where N is an integer. Entity N is designated with reference numeral 170. The entities, 160 through 170, represent the individual tools that are used in the semiconductor wafer manufacturing process.

The various processes of the semiconductor manufacturing process must be performed on the correct inventory using the correct entities in the correct order. If the manufacturing execution system (MES) 110 determines that a particular inventory is not being used on a correct entity, then MES 110 will not allow the entity to operate. Similarly, if the MES 110 determines that a particular inventory is not being processed on an entity in a correct order, the MES 110 will not allow the entity to operate until the inventory is processed in the correct order.

Some types of entities are capable of continually providing status information to the manufacturing execution system (MES) 110. An entity of this type is capable of communicating its operational status to the manufacturing execution system (MES) 110. When the entity is in operation, that fact is communicated to the MES 110. When the entity is idle, that fact is also communicated to the MES 110. In this manner, the MES 110 is continually made aware of the operational status of each entity.

Other types of entities are not capable of continually communicating with the manufacturing execution system (MES) 110. The operational status of these types of entities may not be known to the manufacturing execution system (MES) 110 at all times. For example, if such an entity becomes idle (e.g., after the entity has completed work on a particular inventory), the fact that the entity is idle will not be automatically communicated to the manufacturing execution system (MES) 110. The user must provide this information to the manufacturing execution system (MES) 110.

In addition to the operational status of the entity, entities that are capable of communicating with the MES 110 also provide other types of status information to the MES 110. For an entity to be used in an operation the entity must have an "allowed" status in order to perform the operation. For example, the entity must be capable of performing the operation and must also be within qualification specifications (e.g., not having been used for longer than a specified time period during a single shift). There are rules concerning when a particular entity may be used and by whom. For example, if an entity is owned by the engineering department that entity must be used in accordance with the rules established by the engineering department.

There are also other rules that may affect the availability of an entity. If an entity has just come back from being repaired, the entity may be restricted to operating only on certain types of product and only for specified periods of time.

There may be a particular schedule associated with an entity that regulates how the entity may be used. For example, the schedule may require that a particular entity be used to run a particular lot using a particular reticle.

There may be various restrictions that are put in place to regulate whether a particular entity (i.e., a particular tool) may be used to perform work on a particular type of inventory (i.e., a particular type of wafer lot). The MES 110 keeps track of all of the restrictions imposed on the various entities and inventories of which the MES 100 is made aware. As will be described more fully below, there may also exist various restrictions that are not known to the MES 110.

There may also be other restrictions that may be applied in a number of different ways. These restrictions are communicated to the MES 110 in a "STOP/START notice." A STOP/START notice may be sent to regulate the use of an entity during an operation of a route. For example, a STOP/START notice may state that a particular entity may not be used for a particular operation in a particular route. A STOP/START notice may state that a particular inventory must be operated on using a particular entity. In general, a STOP/START notice may be used to assign the availability of the entities according to certain prearranged conditions.

In addition, special handling instructions for a particular entity or a particular inventory may also be submitted to the MES 110 using a Special Work Request (SWR). A Special Work Request typically establishes a restriction regulating whether a particular entity may be used to perform work on a particular type of inventory.

Instructions may also be submitted to the MES 110 using a Factory Communication message. A Factory Communication message provides instructions that regulate the manufacturing operation. A Factory Communication message may be either "lot based," or "route based," or "product based." For example, a Factory Communication message may state that when a particular lot reaches a particular point in the route, then additional measurements are to be made.

The examples set forth above show that various types of restrictions may exist on the various types of inventory and on the various entities in a semiconductor manufacturing system. The various types of restrictions change over time as new restrictions are put in place and old restrictions expire. The manufacturing execution system (MES) 110 keeps track of the current status of some of the restrictions in real time and stores the current status of those restrictions in database 130. As previously mentioned, there may also be restrictions in place that are not known to the manufacturing execution system (MES) 110.

For restrictions that the manufacturing execution system (MES) 110 does know about, the MES 110 sends "transaction" information to database 130 is a real time manner as the various transactions occur during the semiconductor manufacturing process. MES 110 also sends "structure" information to database 130 in a real time manner. The term "structure" refers to an entity and its status. Database 130 contains both "transactional" and "structural" information concerning the elements of the semiconductor manufacturing process.

In many instances a person who is operating an entity will not be easily able to access information concerning the various restrictions that may apply to the entity. Each entity typically has its own user interface and its own operating codes and abbreviations. The user interface for a particular entity may not be designed to efficiently provide the user with the type of information that allows the user to quickly find what restrictions exist on the use of the entity.

In many instances the first time that the user knows that a particular entity will not accept a particular inventory is when the user tries to perform work on the inventory using the entity. For example, assume that the user picks up a lot of wafers that were misplaced in a storage rack. The lot of wafers that the user picked up is not the correct lot of wafers for the entity. The user then tries to perform work on the wafers using the entity. The MES 110 determines that the lot of wafers is not the correct lot of wafers and will not allow the entity to process the incorrect lot of wafers. The MES 110 does not provide the user with the reason for not processing the wafers. The MES 110 also does not provide the user with the name or title of a person to contact for assistance in resolving the problem.

In another illustrative example, assume that an incident occurs during a semiconductor manufacturing process that causes the quality of the product to be degraded or the yield of the product to be significantly decreased. The initial response to the incident often involves the immediate containment of potential problem sources. Some of the containment actions frequently impose restrictions on the use of many of the entities. The restrictions may be imposed on entities that may turn out not to have been involved in the incident that degraded the quality of caused the yield loss. However, the restrictions that later turn out not be needed remain active in the MES 110 and inhibit the use of the affected entities until the restrictions are removed. Once again a person who desires to use the affected entities must find a person who is qualified to remove the restrictions before the entities may be used.

The present invention provides a system and method for providing real time information to the user that identifies the restrictions that have been placed on the use of specific entities for specific inventories. The present invention also provides a system and method for providing real time information to the user that identifies the person or persons who have authorized the restrictions that have been placed on the use of specific entities for specific inventories.

Figure 2:
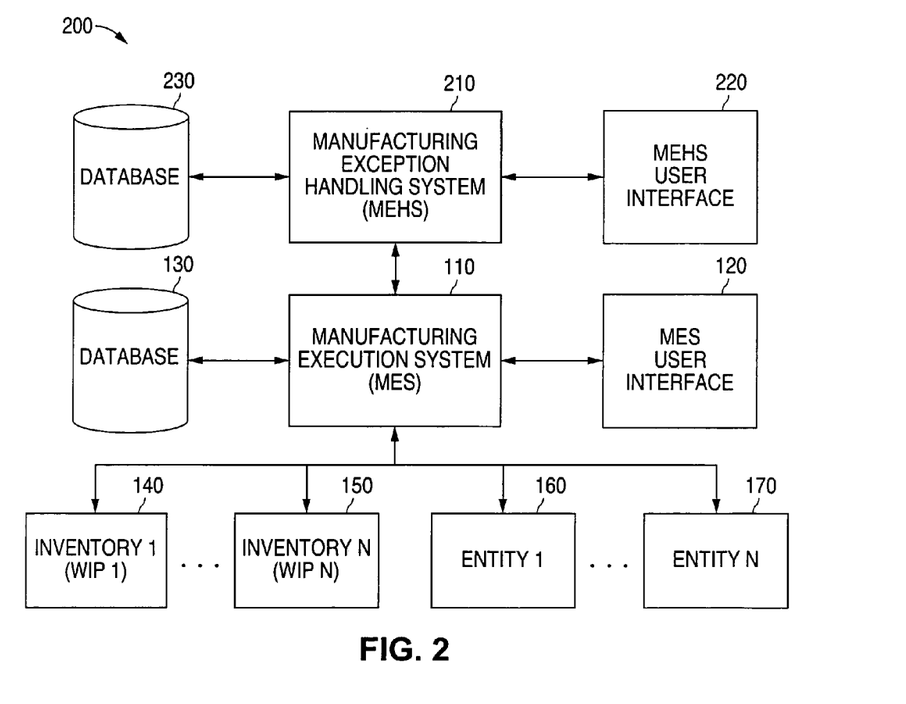
FIG. 2 illustrates a schematic representation of a manufacturing exception handling system (MEHS) in accordance with the principles of the present invention capable of interfacing with the prior art manufacturing execution system (MES) shown in FIG. 1.

FIG. 2 illustrates a schematic representation of a portion of an exemplary semiconductor manufacturing system 200 in accordance with the principles of the present invention. System 200 comprises the system 100 shown in FIG. 1 and a manufacturing exception handling system (MEHS) 210. Manufacturing exception handling system (MEHS) 210 is coupled to and interfaces with manufacturing execution system (MES) 110. Manufacturing exception handling system (MEHS) 210 is also coupled to sources of restriction information that are external to the manufacturing execution system (MES) 110. These external sources of information are represented in FIG. 2 as database 230.

The manufacturing exception handling system (MEHS) 210 is coupled to an MEHS user interface 220. MEHS user interface 220 may comprise any conventional computerized display device including, without limitation, a web-linked interface. The user of the manufacturing exception handling system (MEHS) 210 may enter commands and provide information to the manufacturing exception handling system (MEHS) 210 through the MEHS user interface 220. The user of the manufacturing exception handling system (MEHS) 210 may also receive information from the manufacturing exception handling system (MES) 210 through the MEHS user interface 220.

In one advantageous embodiment the MEHS user interface 220 is a web-linked interface. This allows any user on a suitably connected internet or intranet to view the information that is generated and displayed by the manufacturing exception handling system (MEHS) 210.

Figure 3:
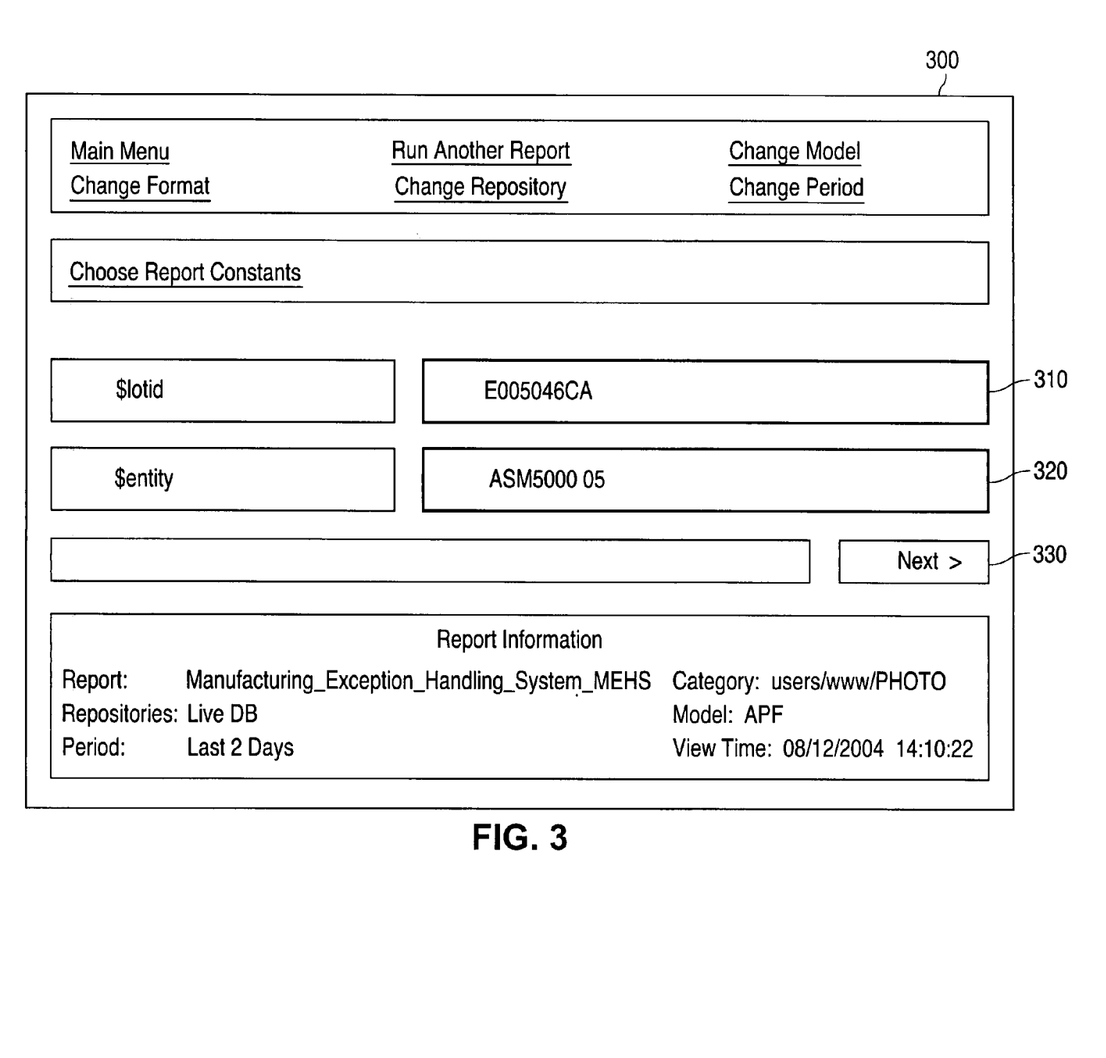
FIG. 3 illustrates an exemplary input format for obtaining restriction information requested for a specified wafer lot and a specified entity in accordance with the principles of the present invention.

The manufacturing exception handling system (MEHS) 210 displays an input format on the MEHS user interface 220. FIG. 3 illustrates an exemplary input format 300 for obtaining restriction information requested for a wafer lot and an entity in accordance with the principles of the present invention. The input format 300 is displayed on a computer monitor or similar display device (not shown). The user may enter data into the MEHS 210 using a keyboard or other similar input device (not shown).

Assume that the user desires to investigate the possibility of placing lot number "E005046CA" on entity "ASM5000 05". The input form 300 uses the term "$lotid" for the lot identification. The user types the lot number "E005046CA" into the window 310 as shown in FIG. 3. The input form 300 uses the term "$entity" for the entity. The user types the entity name "ASM5000 05" into the window 320 as shown in FIG. 3. Then the user activates the search program (e.g., by clicking the Next button 330 with a computer mouse).

The manufacturing exception handling system (MEHS) 210 then conducts a search for all of the restrictions in the database 130 that relate to the identified lot number and entity. The manufacturing exception handling system (MEHS) 210 then conducts a search for all of the restrictions in the database 230 (i.e., the sources of restriction information external to MES 110) that related to the identified lot number and entity. The manufacturing exception handling system (MEHS) 210 then generates a report that presents various categories of information that relate to the applicable restrictions. The manufacturing exception handling system (MEHS) 210 then provides the information to the user through MEHS user interface 220.

Figure 4:
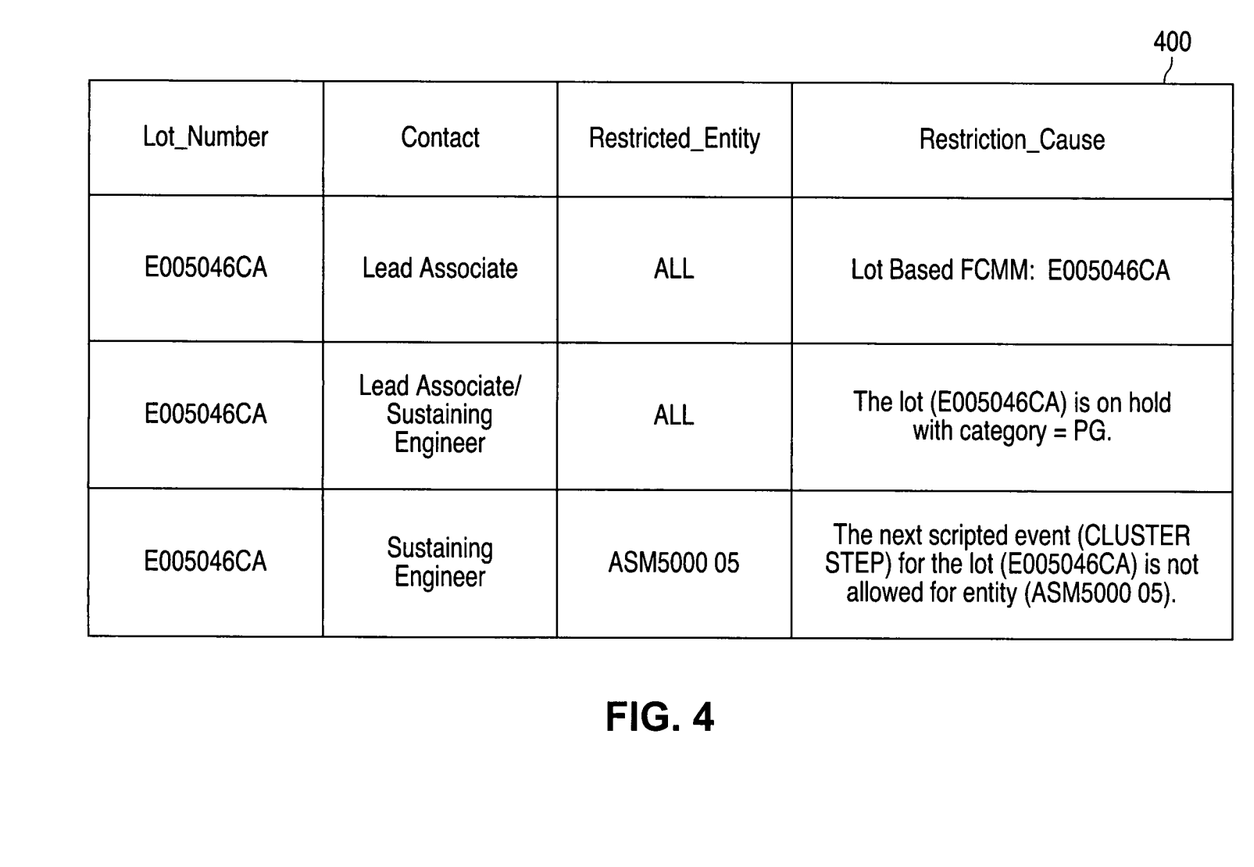
FIG. 4 illustrates an exemplary output format showing the restriction information obtained for the specified wafer lot and the specified entity in the input format shown in FIG. 3.

FIG. 4 illustrates an exemplary output format 400 showing the restriction information obtained for the lot number "E005046CA" on entity "ASM5000 05" that were requested in the input format 300 shown in FIG. 3. In this illustrative example MEHS 210 has identified three entries that relate to lot number "E005046CA." The first entry indicates that lot number "E005046CA" is restricted from being run on all entities. The entry in the Restricted_Entry column is ALL. That is, all entities are restricted for the reason given in the column Restriction_Cause. The reason is a "lot based" Factory Communication message restricting the processing of lot number "E005046CA." The entry in the Contact column is Lead Associate. The Lead Associate is the person who put the restriction in place and who has the authority to remove the restriction.

The second entry indicates that lot number "E005046CA" is again restricted from being run on all entities. The entry in the Restricted_Entry column is ALL. That is, all entities are restricted for the reason given in the column Restriction_Cause. The reason is that lot number "E005046CA" has been placed on hold with a category identified as PG. The initials "PG" stand for Product Group. The entries in the Contact column are Lead Associate and Sustaining Engineer. The Lead Associate and the Sustaining Engineer are the persons who put the restriction in place and who have the authority to remove the restriction.

The third entry indicates that lot number "E005046CA" is restricted from being run on the entity "ASM5000 05". The entry in the Restricted_Entry column is "ASM5000 05". That is, the entity "ASM5000 05" is restricted for lot number "E005046CA" for the reason given in the column Restriction_Cause. The reason is that the next scripted event (CLUSTER STEP) for the lot number "E005046CA" is not allowed for the entity "ASM5000 05." The entry in the Contact column is Sustaining Engineer. The Sustaining Engineer is the person who put the restriction in place and who has the authority to remove the restriction.

In the examples given above, the titles of the authorized persons have been displayed in the Contact column (e.g., Lead Associate). It is understood that the names of the authorized persons (e.g., Mr. Smith) could have been displayed in the Contact column instead of or in addition to the titles of the authorized persons. The titles of authorized persons may include, without limitation, Lead Associate, Supervisor, Sustaining Engineer, Process Owner, Information System Technician, Research Team Leader, and other similar titles.

The output of the manufacturing handling system (MEHS) 210 of the present invention is not limited to the exemplary outputs shown in the columns set forth above in FIG. 4. That is, other types of information may also be output. For example, there could be an output field that shows the date and time when a particular restriction was put in place. There could be an output field that shows the date and time when a particular restriction expires. There could be an output field that shows who is authorized to remove a restriction if that person is not the same as the person who put the restriction in place and the person who put the restriction in place is not authorized to remove the restriction. Other similar types of useful information may also be output by MEHS 210.

If the manufacturing exception handling system (MEHS) 210 is provided with only an entity (and is not provided with a lot number) then the MEHS 210 will display a list of all restricted lots for that entity (e.g., misdelivered lot on the shelf, the next event for a lot is not allowed for this entity, the lot is on hold, etc.).

In one advantageous embodiment the manufacturing exception handling system (MEHS) 210 compiles and generates reports using the Workstream Classic™ software in the manufacturing execution system (MES) 110 and database 130. The manufacturing exception handling system (MEHS) 210 also compiles and generates reports using an Advanced Productivity Family™ (APF) software suite of Brooks Automation Software™. The Brooks Automation Software™ comprises (1) a formatter software module (similar to a programming language for generating reports), (2) an activity manager software module, (3) a dispatch module, and (4) a rule editor.

The Advanced Productivity Family™ (APF) software suite of Brooks Automation Software™ enables the manufacturing exception handling system (MEHS) to combine restriction information from sources that are external to the manufacturing execution system (MES) 110 (represented by database 230) into the restriction information report. The sources that are external to the MES 110 may comprise flat files from STOP/START notices, Special Work Requests (SWR), Mask Management Database, etc.

The manufacturing exception handling system (MEHS) 210 of the present invention determines the identity and nature of restrictions that are in force by reviewing the "transactional" information and the "structural" information contained within the MES 110 and database 130 and within the external sources (represented by database 230). In particular, the manufacturing exception handling system (MEHS) 210 searches for allowed operations, allowed entities, allowed events, logic tests on event/entity pairs, hold lot enabled Factory Communication messages base on pairing of lot, product, or route with operation, recipe download disabling, station controller pick lists, and the like.

In some cases one or more entities may be coupled to and controlled by a station controller. A station controller is a computer control device that comprises computer hardware and software that is capable of operating the entities and processing the inventories under its control. A station controller also typically comprises a computer display device such as a computer monitor. Some types of station controllers display a pick list of semiconductor wafer lots on the computer monitor. The user selects the name of one of the semiconductor wafer lots in the pick list and sends a command to the station controller to activate the entity to process the selected semiconductor wafer lots.

In prior art station controllers if the desired semiconductor wafer lot is restricted, the name of the restricted semiconductor wafer lot will not appear in the pick list. Therefore, a prior art station controller will not be able to activate the entity to process the restricted semiconductor wafer lot.

Figure 5:
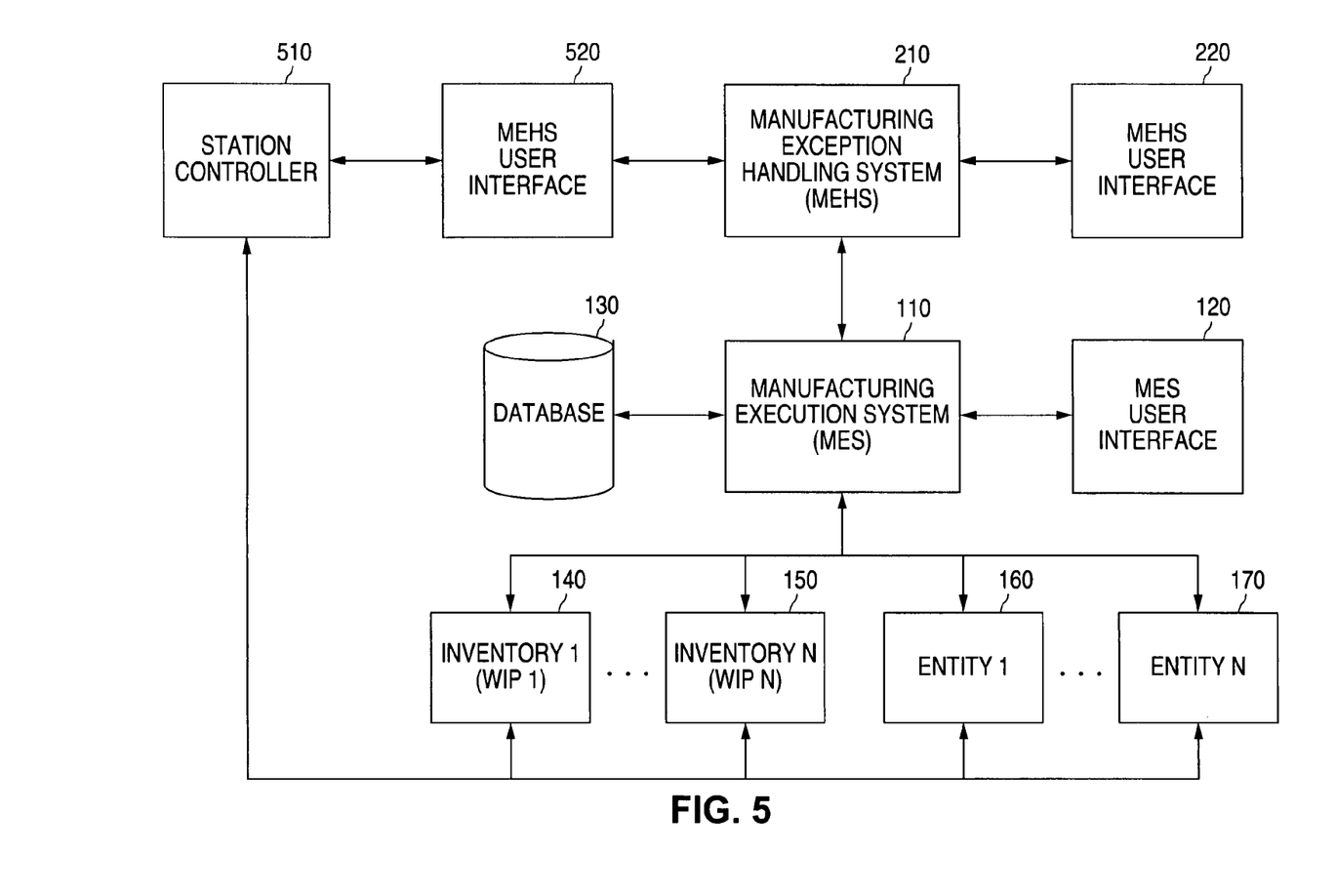
FIG. 5 illustrates a schematic representation of a manufacturing exception handling system (MEHS) in accordance with the principles of the present invention capable of interfacing with a prior art manufacturing execution system (MES) and a prior art station controller.

In one advantageous embodiment of the invention the manufacturing exception handling system (MEHS) 210 is coupled to each of the station controllers in the semiconductor manufacturing system. An example of such an embodiment comprising one station controller 510 is shown in FIG. 5. Of course, more than one station controller may be coupled to the manufacturing exception handling system (MEHS) 210. The arrangement shown in FIG. 5 is merely illustrative of the concept of using manufacturing exception handling system (MEHS) 210 to interface with a station controller. (For purposes of clarity, the external source database 230 shown in FIG. 2 is not shown in FIG. 5.)

Station controller 510 is coupled to manufacturing exception handling system (MEHS) 210 through MEHS user interface 520. The MEHS user interface 520 may be accessed through an MEHS user interface button (not shown) displayed on the computer monitor of station controller 510. When a user of station controller 510 does not find a desired semiconductor wafer lot in the displayed pick list, the user accesses the manufacturing exception handling system (MEHS) to find why the semiconductor wafer lot is restricted. Then the user can immediately identify the restriction and identify the person who is authorized to remove the restriction.

The present invention provides a great savings in time and manufacturing efficiency. With the present invention it is no longer necessary to spend time manually searching for the reason why a semiconductor wafer lot is restricted or why the use of an entity is restricted. No time is wasted looking for the reason for the restriction. No time is wasted determining what person or persons are authorized to remove the restriction.

In the prior art system it was often necessary to completely stop the semiconductor manufacturing process while the restriction problems were sorted out. In the present invention, the user of the manufacturing exception handling system (MEHS) 210 can research the restriction problems in advance and take steps to avoid having to shut down the semiconductor manufacturing process.

Figure 6:
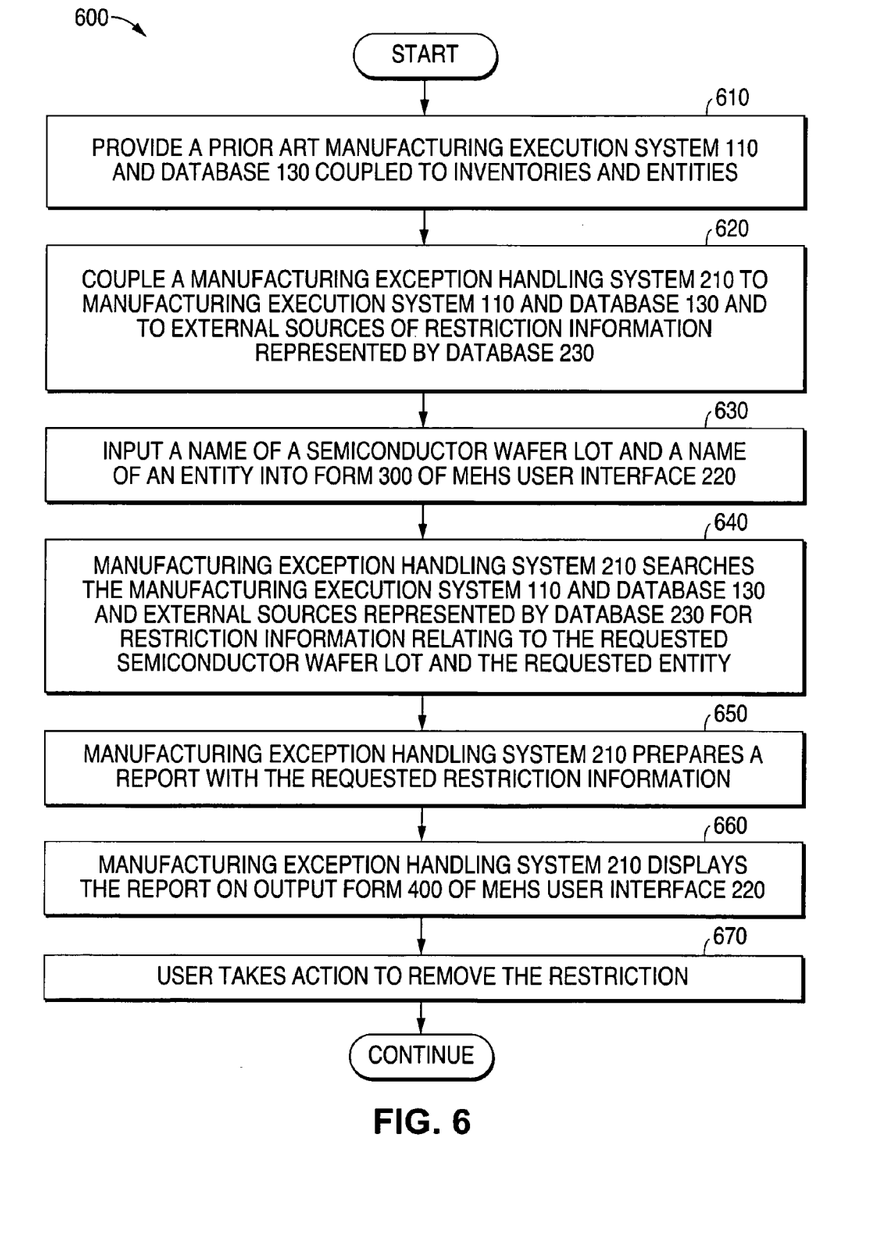
FIG. 6 illustrates a flow chart showing the steps of an advantageous embodiment of the method of the present invention.

FIG. 6 illustrates a flow chart 600 showing the steps of an advantageous embodiment of the method of the present invention. In the first step of the method a prior art manufacturing execution system 110 and database 130 is provided. The manufacturing execution system 110 is coupled to a plurality of inventories, 140 through 150, and to a plurality of entities, 160 through 170 (step 610). Then a manufacturing exception handling system 210 of the present invention is coupled to the manufacturing execution system 110 and database 130 and is coupled to external sources of restriction information represented by database 230 (step 620). Then a name of a semiconductor wafer lot and a name of an entity are input into form 300 of the MEHS user interface 220 (step 630).

The manufacturing exception handling system 210 searches the manufacturing execution system 110 and database 130 and searches the external sources of restriction information represented by database 230 for restriction information relating to the requested semiconductor wafer lot and the requested entity (step 640). Then the manufacturing exception handling system 210 prepares a report with the requested restriction information (step 650). The manufacturing exception handling system 210 displays the report on output form 400 of the MEHS user interface 220 (step 660). The user then takes action to remove the restriction. If the user is not authorized to remove the restriction the user calls a person who is authorized to remove the restriction (step 670).

The output report may list more than one restriction and may list more than one reason for restriction.

Although the present invention has been described with an exemplary embodiment, various changes and modifications may be suggested to one skilled in the art. It is intended that the present invention encompass such changes and modifications as fall within the scope of the appended claims.

What is claimed is:

1. For use with a manufacturing execution system that controls a semiconductor manufacturing process, a method for identifying a restriction that has been placed on at least one entity of said semiconductor manufacturing process, said method comprising the steps of:
   coupling a manufacturing exception handling system to said manufacturing execution system; and
   accessing, with said manufacturing exception handling system, restriction information in said manufacturing execution system for said at least one entity;
   wherein the restriction information identifies whether the at least one entity can be used to perform work on at least one inventory of the semiconductor manufacturing process.

2. The method as set forth in claim 1 wherein said step of accessing said restriction information comprises the step of:
   accessing said restriction information in a database that is coupled to said manufacturing execution system.

3. The method as set forth in claim 1 wherein said restriction information comprises at least one of: type of restriction, date and time restriction started, date and time restriction is scheduled to end, person who authorized restriction, person who is authorized to end restriction, title of person who authorized restriction, and title of person who is authorized to end restriction.

4. The method as set forth in claim 1 further comprising the step of:
   accessing, with said manufacturing exception handling system, second restriction information in said manufacturing execution system for the at least one inventory.

5. The method as set forth in claim 4 wherein said step of accessing said second restriction information comprises the step of:
   accessing said second restriction information in a database that is coupled to said manufacturing execution system.

6. The method as set forth in claim 5 wherein said second restriction information comprises at least one of: type of restriction, date and time restriction started, date and time restriction is scheduled to end, person who authorized restriction, person who is authorized to end restriction, title of person who authorized restriction, and title of person who is authorized to end restriction.

7. The method as set forth in claim 1 further comprising the steps of:
   providing to said manufacturing exception handling system a name of an inventory and a name of an entity using a manufacturing exception handling system interface; and
   accessing, with said manufacturing exception handling system, second restriction information in said manufacturing execution system for said inventory and for said entity.

8. The method as set forth in claim 7 wherein said manufacturing exception handling system interface comprises a web-linked interface.

9. The method as set forth in claim 7 further comprising the steps of:
   generating a report that comprises said second restriction information; and
   displaying said report on said manufacturing exception handling system interface.

10. The method as set forth in claim 9 wherein said second restriction information comprises at least one of: type of restriction, date and time restriction started, date and time restriction is scheduled to end, person who authorized restriction, person who is authorized to end restriction, title of person who authorized restriction, and title of person who is authorized to end restriction.

11. The method as set forth in claim 7 wherein said name of said inventory and said name of said entity are provided to a station controller coupled to said manufacturing exception handling system through a manufacturing exception handling system interface.

12. The method as set forth in claim 11 further comprising the steps of:
   generating a report that comprises said second restriction information; and
   displaying said report on said station controller through said manufacturing exception handling system interface.

13. The method as set forth in claim 12 wherein said second restriction information comprises at least one of: type of restriction, date and time restriction started, date and time restriction is scheduled to end, person who authorized restriction, person who is authorized to end restriction, title of person who authorized restriction, and title of person who is authorized to end restriction.

14. For use with a manufacturing execution system that controls a semiconductor manufacturing process, a method for identifying a restriction that has been placed on at least one inventory of said semiconductor manufacturing process, said method comprising the steps of:
   coupling a manufacturing exception handling system to said manufacturing execution system; and
   accessing, with said manufacturing exception handling system, restriction information in said manufacturing execution system for said at least one inventory;
   wherein the restriction information identifies whether at least one entity of the semiconductor manufacturing process can be used to perform work on the at least one inventory.

15. The method as set forth in claim 14 wherein said step of accessing said restriction information comprises the step of:
   accessing said restriction information in a database that is coupled to said manufacturing execution system.

16. The method as set forth in claim 15 wherein said restriction information comprises at least one of: type of restriction, date and time restriction started, date and time restriction is scheduled to end, person who authorized restriction, person who is authorized to end restriction, title of person who authorized restriction, and title of person who is authorized to end restriction.

17. For use with a manufacturing execution system that controls a semiconductor manufacturing process, an apparatus for identifying a restriction that has been placed on one or more of: at least one entity of said semiconductor manufacturing process and at least one inventory of said semiconductor manufacturing process, said apparatus comprising:
   a manufacturing exception handling system coupled to said manufacturing execution system;
   wherein said manufacturing exception handling system is capable of accessing restriction information in said manufacturing execution system for one or more of: said at least one entity and said at least one inventory; and wherein the restriction information identifies whether the at least one entity can be used to perform work on the at least one inventory.

18. The apparatus as set forth in claim 17 wherein said restriction information comprises at least one of: type of restriction, date and time restriction started, date and time restriction is scheduled to end, person who authorized restriction, person who is authorized to end restriction, title of person who authorized restriction, and title of person who is authorized to end restriction.

19. The apparatus as set forth in claim 17 further comprising a manufacturing exception handling system user interface coupled to said manufacturing exception handling system;
   wherein said manufacturing exception handling system user interface is capable of:
      receiving input from a user to request said restriction information; and
      displaying said restriction information.

20. The apparatus as set forth in claim 19 wherein said manufacturing exception handling system user interface comprises a web-linked interface.

21. For use with a manufacturing execution system that controls a semiconductor manufacturing process, a method for identifying a restriction that has been placed on at least one entity of said semiconductor manufacturing process, said method comprising the steps of:
   coupling a manufacturing exception handling system to said manufacturing execution system;
   coupling said manufacturing exception handling system to at least one external source of restriction information that is external to said manufacturing execution system; and
   accessing, with said manufacturing exception handling system, restriction information for said at least one entity in at least one of: said manufacturing execution system and said at least one external source;
   wherein the restriction information identifies whether the at least one entity can be used to perform work on at least one inventory of the semiconductor manufacturing process.

22. The method as set forth in claim 21 wherein said step of accessing said restriction information comprises the step of:
   accessing said restriction information in at least one of: (1) a database that is coupled to said manufacturing execution system and (2) said at least one external source.

23. The method as set forth in claim 21 wherein said restriction information comprises at least one of: type of restriction, date and time restriction started, date and time restriction is scheduled to end, person who authorized restriction, person who is authorized to end restriction, title of person who authorized restriction, and title of person who is authorized to end restriction.

24. The method as set forth in claim 21 further comprising the step of:
   accessing, with said manufacturing exception handling system, second restriction information for the at least one inventory in at least one of: said manufacturing execution system and said at least one external source.

25. The method as set forth in claim 24 wherein said step of accessing said second restriction information comprises the step of:
   accessing said second restriction information in at least one of: (1) a database that is coupled to said manufacturing execution system and (2) said at least one external source.

26. The method as set forth in claim 25 wherein said second restriction information comprises at least one of: type of restriction, date and time restriction started, date and time restriction is scheduled to end, person who authorized restriction, person who is authorized to end restriction, title of person who authorized restriction, and title of person who is authorized to end restriction.

27. The method as set forth in claim 21 further comprising the steps of:
   providing to said manufacturing exception handling system a name of an inventory and a name of an entity using a manufacturing exception handling system interface; and
   accessing, with said manufacturing exception handling system, second restriction information for said inventory and for said entity in at least one of: said manufacturing execution system and said at least one external source.

28. The method as set forth in claim 27 wherein said manufacturing exception handling system interface comprises a web-linked interface.

29. The method as set forth in claim 27 further comprising the steps of:
   generating a report that comprises said second restriction information; and
   displaying said report on said manufacturing exception handling system interface.

30. The method as set forth in claim 29 wherein said second restriction information comprises at least one of; type of restriction, date and time restriction started, date and time restriction is scheduled to end, person who authorized restriction, person who is authorized to end restriction, title of person who authorized restriction, and title of person who is authorized to end restriction.

31. The method as set forth in claim 27 wherein said name of said inventory and said name of said entity are provided to a station controller coupled to said manufacturing exception handling system through a manufacturing exception handling system interface.

32. The method as set forth in claim 31 further comprising the steps of:
   generating a report that comprises said second restriction information; and
   displaying said report on said station controller through said manufacturing exception handling system interface.

33. The method as set forth in claim 32 wherein said second restriction information comprises at least one of: type of restriction, date and time restriction started, date and time restriction is scheduled to end, person who authorized restriction, person who is authorized to end restriction, title of person who authorized restriction, and title of person who is authorized to end restriction.

34. For use with a manufacturing execution system that controls a semiconductor manufacturing process, a method for identifying a restriction that has been placed on at least one inventory of said semiconductor manufacturing process, said method comprising the steps of:
   coupling a manufacturing exception handling system to said manufacturing execution system;
   coupling said manufacturing exception handling system to at least one external source of restriction information that is external to said manufacturing execution system; and
   accessing, with said manufacturing exception handling system, restriction information for said at least one inventory in at least one of: said manufacturing execution system and said at least one external source;

wherein the restriction information identifies whether at least one entity of the semiconductor manufacturing process can be used to perform work on the at least one inventory.

35. The method as set forth in claim 34 wherein said step of accessing said restriction information comprises the step of:
accessing said restriction information in at least one of: (1) a database that is coupled to said manufacturing execution system and (2) said at least one external source.

36. The method as set forth in claim 35 wherein said restriction information comprises at least one of: type of restriction, date and time restriction started, date and time restriction is scheduled to end, person who authorized restriction, person who is authorized to end restriction, title of person who authorized restriction, and title of person who is authorized to end restriction.

37. For use with a manufacturing execution system that controls a semiconductor manufacturing process, an apparatus for identifying a restriction that has been placed on one or more of: at least one entity of said semiconductor manufacturing process and at least one inventory of said semiconductor manufacturing process, said apparatus comprising:
a manufacturing exception handling system coupled to said manufacturing execution system and coupled to at least one external source of restriction information that is external to said manufacturing execution system;
wherein said manufacturing exception handling system is capable of accessing restriction information in said manufacturing execution system and in said at least one external source for at least one of: said at least one entity and said at least one inventory; and
wherein the restriction information identifies whether the at least one entity can be used to perform work on the at least one inventory.

38. The apparatus as set forth in claim 37 wherein said restriction information comprises at least one of: type of restriction, date and time restriction started, date and time restriction is scheduled to end, person who authorized restriction, person who is authorized to end restriction, title of person who authorized restriction, and title of person who is authorized to end restriction.

39. The apparatus as set forth in claim 37 further comprising a manufacturing exception handling system user interface coupled to said manufacturing exception handling system;
wherein said manufacturing exception handling system user interface is capable of:
receiving input from a user to request said restriction information; and
displaying said restriction information.

40. The apparatus as set forth in claim 39 wherein said manufacturing exception handling system user interface comprises a web-linked interface.

* * * * *